UNITED STATES PATENT OFFICE.

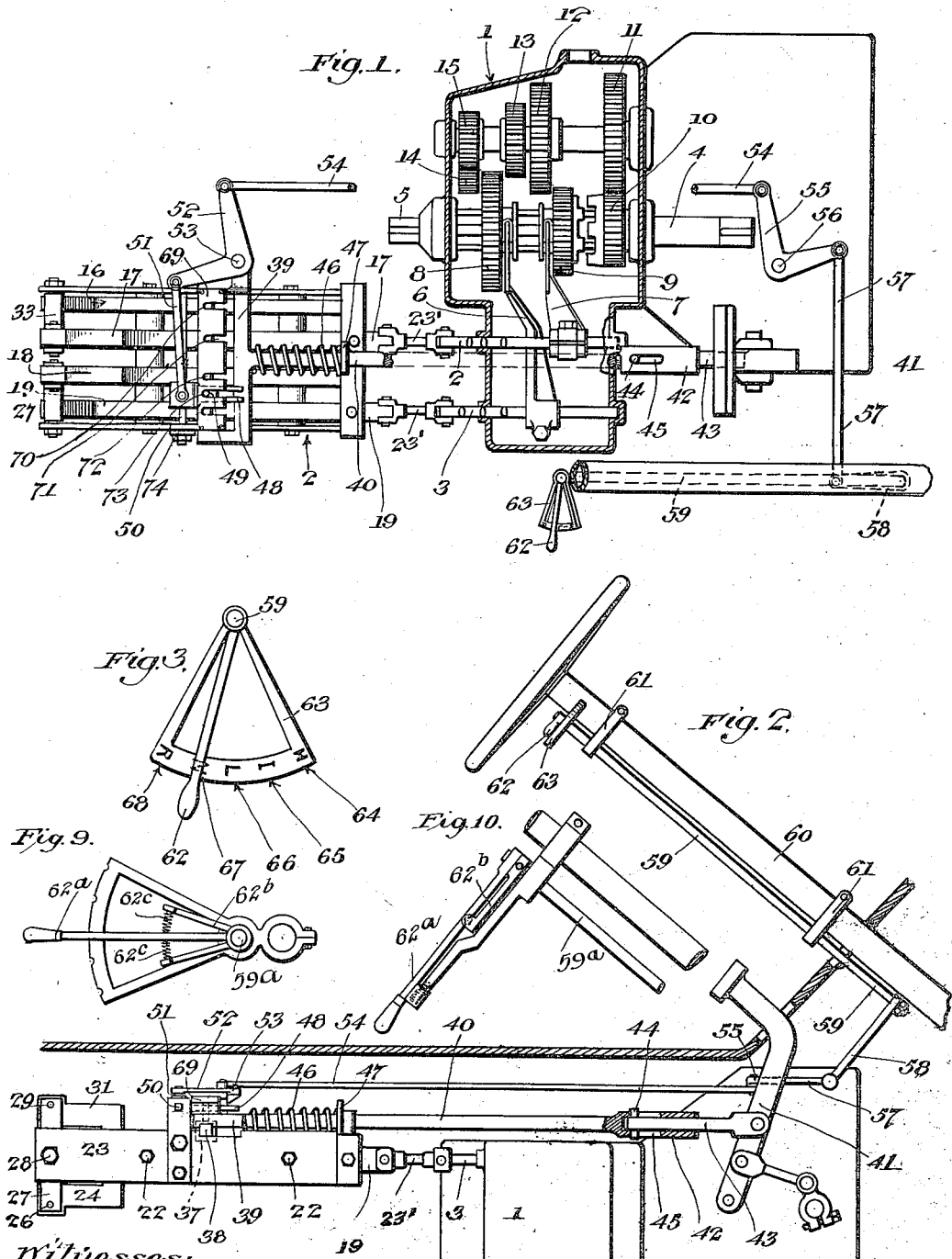

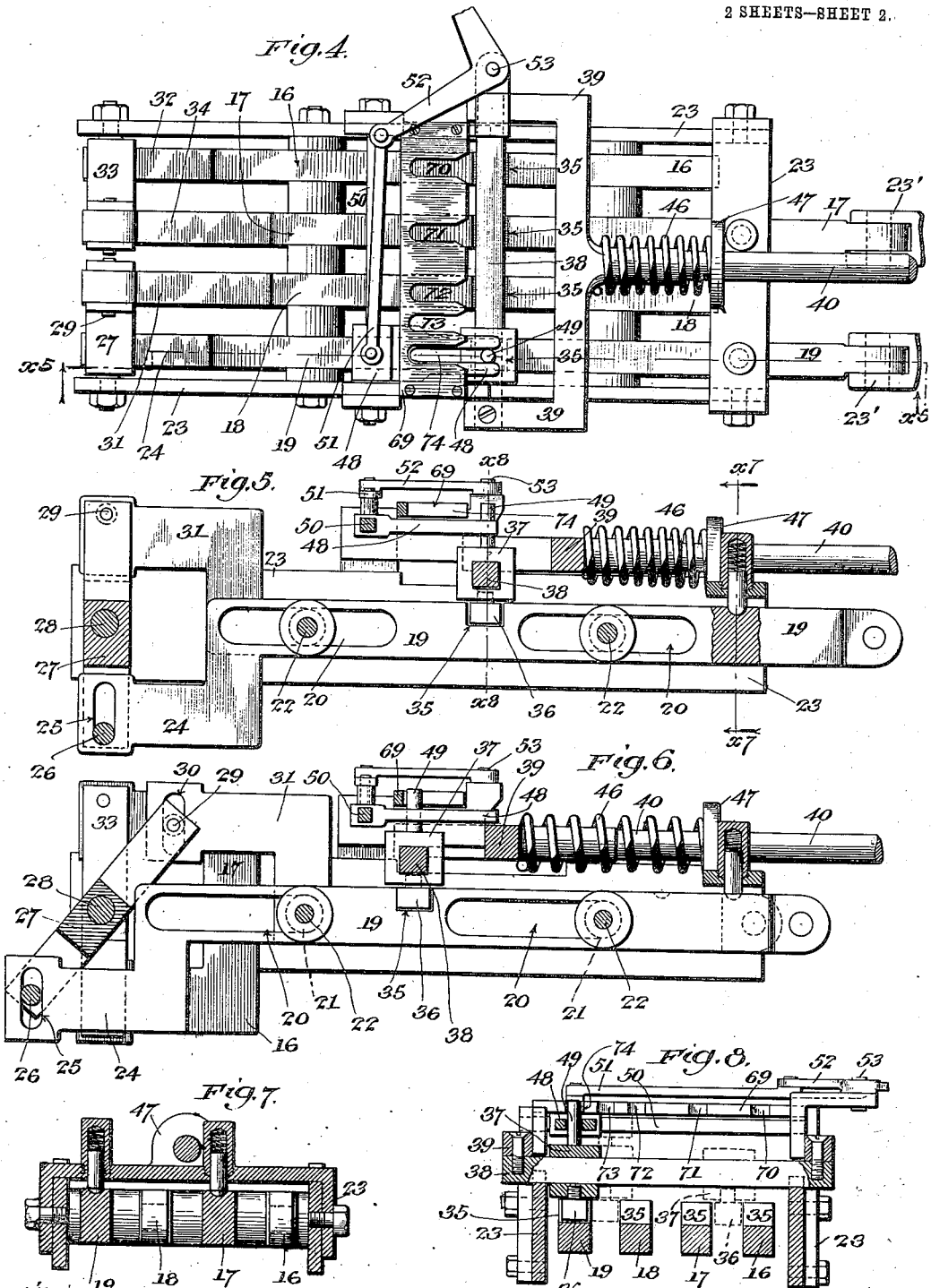

PERCY F. RICE, OF TUSTIN, CALIFORNIA, ASSIGNOR OF ONE-HALF TO W. H. FAUST, OF LOS ANGELES, CALIFORNIA.

GEAR-SHIFTING MECHANISM.

1,087,552.  Specification of Letters Patent.  Patented Feb. 17, 1914.

Application filed April 7, 1913. Serial No. 759,533.

*To all whom it may concern:*

Be it known that I, PERCY F. RICE, a citizen of the United States, residing at Tustin, in the county of Orange and State of California, have invented a new and useful Gear-Shifting Mechanism, of which the following is a specification.

This invention relates to a gear shifting mechanism especially adapted for use in motor cars, and the objects of the invention are to eliminate the hand operated lever which selects and slides the gears into or out of position, and to provide a device which is semi-automatic, which embodies a small manually controlled selecting device which may be mounted at any convenient point near the driver, as for example, on the steering column, which may be easily and quickly set in the desired position to select the gear combination desired and the actual shifting movement of the gears performed by other mechanism, as for example, by means of the clutch lever. In using the clutch lever for this purpose, I utilize one portion of its movement for the shifting of the gears and the other portion of its movement for the regular operation of the clutch. Thus, assuming the clutch is engaged, the first forward movement of the clutch lever is utilized to release the clutch in the usual manner and the next forward portion of movement is utilized to produce the necessary power for shifting the gears, such power preferably consisting of compressing a spring, so that the first portion of the return movement of the clutch lever will allow the spring to perform its work of shifting the gears which have been selected, while the remainder of the return movement of the clutch lever is utilized for engaging the clutch in the usual manner. By utilizing the clutch lever in this manner, the functions take place in the proper sequence and automatically prevent wrong operation. Thus, the clutch must always be disengaged before any gears are shifted and the clutch should not again be engaged until the gears have been shifted and these conditions are thereby perfectly fulfilled. There is another very important advantage gained by this combination in that the shifting of the gears is not entirely automatic, so that it is possible for the driver when letting back the clutch lever to shift the gears, to ease it back gradually so that if the gears do not properly mesh at the first contact, the driver can alternately push and ease back the clutch lever with short movements until the gears properly mesh, and then let the clutch lever come back the full distance to let the gears slide into engagement. In this manner the driver can, through his foot, feel the condition of the gears and let them in easily without unnecessary clashing in much the same manner as is now done in using the hand operated side lever.

As the gear shifting operation is performed by the foot of the driver, it leaves one of his hands free for other duty, as but a slight movement of the hand is required to set the selecting lever in position.

A further advantage is that by the elimination of the gear shifting lever, the vehicle is much better adapted when arranged for left hand drive, in that there is no gear shifting lever standing up in the middle of the foot-board so that this space is left free and unobstructed.

Many other advantages will be brought out from the following description.

Referring to the drawings: Figure 1 is a plan view of the complete mechanism, showing the parts in neutral position, part of the gear box and post of the steering wheel being broken away. Fig. 2 is a side elevation of the mechanism shown in Fig. 1. Fig. 3 is a plan view in detail on a large scale of the selecting lever and its sector. Fig. 4 is a plan view of the selecting and shifting mechanism, showing the parts in position with the clutch lever in farthest position forward. Fig. 5 is a section on line $x^5$—$x^5$, Fig. 4. Fig. 6 is a view similar to Fig. 5, showing the parts in position with gears shifted into operating position. Fig. 7 is a section on line $x^7$—$x^7$, Fig. 5. Fig. 8 is a section on line $x^8$—$x^8$, Fig. 5. Fig. 9 is a plan view of a modified form of controlling lever. Fig. 10 is a side elevation of the form shown in Fig. 9.

The gears and gear box indicated at 1 are in general, of any well known form and construction, which are operated by two sliding rods 2 and 3. These rods 2 and 3 are ordinarily actuated by a hand operated gear-shift lever, but I employ the gear shifting mechanism designated by 2. In the present instance I have shown the device as adapted to a gearing giving three forward speeds and one reverse. Thus, by pushing forward rod 3, the low speed is secured and by placing rod 3 in the rear position, a reverse movement is obtained. By shifting the rod 2 to the rear, the second or intermediate speed is obtained and by placing the rod 2 in forward position, the third or high speed is obtained, and by placing both rods 2 and 3 in the central position, a neutral condition is obtained in which the gears do not act to transmit power in either direction.

4 designates the driving shaft which is connected with the motor shaft and constantly revolves with the motor, and 5 is the driven shaft which is operated through the medium of the transmission gears. The rods 2 and 3 respectively operate forks 6 and 7 which in turn shift gears 8 and 9. Gears 10 and 11 are in constant mesh. By moving forward rod 2, gear 9 may be clutched with gear 10 and the shaft 4 will then transmit power direct to shaft 5, giving the high speed. By sliding rod 2 to the rear, gear 9 will be moved into mesh with gear 12 and the shaft 5 will be driven at the second or intermediate speed. By sliding rod 3 forward, gear 8 will be moved into mesh with gear 13 and the first or low speed forward secured. By moving rod 3 to the rear, gear 8 will be placed in mesh with gear 14 and the latter being constantly in mesh with gear 15 will impart a reverse rotation to shaft 5 at a slow speed, thereby giving a reverse direction of travel. All of the foregoing construction is well known.

The gear shifting mechanism indicated at 2 comprises four slides 16, 17, 18 and 19, each having slots 20 which travel on rollers 21, the latter being supported on shafts 22 which are mounted on a frame 23. The slides 17 and 19 are longer than the other two slides and are connected by links 23' with the rods 2 and 3. In order to properly operate the rods 2 and 3, the slides 17 and 19 have relative corresponding movements and positions, the slide 17 having a forward position, a neutral position and a rear position, and the slide 19 having a forward position, a neutral position and a rear position. The slide 19 has a depending offset arm 24 with a vertical slot 25 which engages a pin 26 on a crank 27, pivoted at 28. The upper end of crank 27 has a pin 29 which engages in a vertical slot 30 in an upwardly projecting offset arm 31 on the slide 18. The slide 16 has a depending arm 32 which is similarly operatively connected with the lower end of a crank 33 and the latter connected in a similar manner at its upper end to a raised offset arm 34 on the slide 17. Thus, if the slide 16 is moved rearwardly, it will oscillate the crank 33 and move the slide 17 forward. To obtain the rear position of slide 17, the slide 17 is actuated directly toward the rear. To obtain the forward position of slide 19, the slide 18 is retracted which oscillates crank 27 and moves slide 19 forward. To obtain the rear position of slide 19, the latter is moved directly to the rear. When either slide 17 or 19 is moved directly to the rear, the associated slide 16 or 18 operates forward, but this movement is only incidental.

Each of the slides 16, 17, 18 and 19 is provided with a notch 35 which stand in a line with each other when the four slides are in neutral position, as shown in Fig. 4. Slidable transversely of the bank of slides and adapted to engage in either of the notches 35 is a boss 36 which is carried on the lower side of a block 37 which is slidably mounted on a cross bar 38, the latter being mounted on a yoke 39. The yoke 39 is mounted to slide on the frame 23 and is operated by a stem 40, the latter extending forward and being connected with the regular clutch lever 41. The rod 40 does not have a rigid connection with clutch lever 41, but has a hollow socket 42 on its end which telescopes with a rod 43, the latter being directly connected to the clutch lever 41 and having a pin 44 which slides in a slot 45 in the socket 42, as shown in Fig. 2. The rearward movement of yoke 39 is the movement utilized to shift the gears and this movement is produced by a compression spring 46, one end of which engages the yoke and its other end bears against an abutment 47 on the frame 23. The forward movement of yoke 39 is produced by operating clutch lever 41 and this movement compresses spring 46, thus storing power in spring 46 which is utilized during the return movement of clutch lever 41.

The boss 36 is moved into engagement with either of the slides or into a neutral position between two of the slides 18 and 19, by shifting the block 37 on the bar 38. This shifting mechanism must permit of the necessary longitudinal shifting motion of the boss 36 which takes place when the yoke 39 is operated. This is accomplished by a fork 48 which engages a pin 49 projecting upwardly from the block 37, the fork 48 being slidable laterally of the frame 23 on a bar 50 and being operated by means of a link 51 which is connected with a bell crank lever 52 pivoted at 53 and connected by a reach rod 54 with bell crank lever 55 pivoted at 56 and connected by link 57 with an arm 58 projecting from the lower end of a shaft 59 which extends along the steering post 60 and is revolubly supported by brackets 61. The upper end of the shaft 59 is provided with a handle 62 which may be operated over a sector 63, the latter being provided with indicating marks 64 designating the third speed; marks 65 designating the second speed, marks 66 designating the first speed, marks 67 designating the neutral position, and marks 68 designating the reverse position.

A comb 69 is arranged above the frame 23, being rigidly secured thereto, and is formed with slots 70, 71, 72, 73 and 74 which are respectively located directly in line with the path of movement of the pin 49, while the boss 36 is in engagement with either of the slides 16, 17, 18 or 19, with the exception that the slot 73 in the comb 69 is located at a point between slides 18 and 19. The object of these slots is to prevent the block 37 from being shifted after it has moved back any one of the slides. Without the comb 69 it would be possible to slide the block 37 laterally without engagement with notch 35 in one of the slides when the slide has been shifted from neutral position and the associated gears in the gear box were in mesh. This would lead to serious consequences as it would permit the return of the block 37 to neutral position and reëngagement with another slide and actuation of the latter slide, while the first slide was still in a shifted position. With the comb, however the pin 49 can only travel back in one of the slots in the comb and can not be moved laterally except when it is free from the comb and in neutral position. The slot 73 is provided for a neutral position and permits the yoke 39 to be operated when the boss 36 of block 37 stands between the slides 18 and 19 without actuating either of these slides. A neutral position is also afforded for the boss 36 in either of the spaces between the other slides, but as only one neutral position is needed, only one slot 73 is provided for this purpose and it is located between slides 18 and 19 which respectively correspond with the low speed and reverse gears, and is, therefore, the most convenient and appropriate position for the neutral.

The operation is as follows: The parts stand in normal position when as shown in Fig. 1, the clutch lever 41 being retracted and the clutch engaged, the selecting lever 62 standing in neutral position, and the pin 49 lying within slot 73. With the parts in these positions, the clutch lever 41 can be freely operated to release the clutch, or if desired, it may be operated farther forward through the full length of its throw without actuating the gear shifting mechanism in any manner, the latter portion of its throw simply causing pin 49 to slide idly forward and back in slot 73. Let it be assumed that the motor car is standing with the engine running and it is desired to start. The first act is to push forward the clutch lever 41 through the first portion of its forward movement, which act releases the clutch, but does not draw forward the yoke 39, for the pin 44 is only drawn to the forward end of slot 45 in sleeve 42. Although the clutch has been thus released, the pin 49 still lies in the bottom of slot 73, because yoke 39 has not yet been moved forward.

Continued forward movement of the clutch lever 41 now causes pin 44 to act upon sleeve 42 and pull forward rod 40 and yoke 39, compressing spring 46 and moving pin 49 forward, and when the clutch lever 41 has been pushed completely forward, the pin 49 will have been moved forward enough to clear the slot 73 and permit the pin 49 to be moved laterally. The selecting lever 62 is now operated manually by the driver, who swings it into a position over "L" on the sector 62, into alinement with position indicated at 66. This action rocks the shaft 59 and through the before-described connections moves the block 37 to the left, bringing boss 36 into engagement with notch 35 in slide 18. This adjustment of the selecting lever 62 requires but the slightest movement of the hand, no appreciable power being required to operate it. The next action is for the driver to ease back on the clutch lever 41, the backward movement being accomplished by the spring 46 assisted by the regular clutch spring. This moves the yoke 39 back and carries the block 37 rearwardly, thereby causing the boss 36 which is in engagement with slide 31 to move the slide 31 rearwardly and as slide 31 moves rearwardly, it rocks crank 27 and the latter pushes the slide 19 forwardly and the latter pushes forward rod 3 and places gear 8 in mesh with gear 13, this operation taking place during the first portion of the rearward movement of the clutch lever 41, and after the gears have thus been placed in mesh with each other, continued rearward movement of the clutch lever 41 is employed in engaging the clutch in the usual manner, whereupon the vehicle moves ahead propelled at the low speed. With the car moving ahead at low speed, to shift to the second speed is simply a repetition of the operation just described, with the exception that the selecting lever 62 is adjusted into the position over "L" on the sector 62, and for the third speed the selecting lever 62 is adjusted into a position over "H" on the sector 62, while for a reverse direction of travel, the selecting lever 62 is adjusted to a position over "R" on the sector 62. In adjusting the selecting lever 62 from any of the gear engaging positions to another, the selecting lever does not have to be moved back to a neutral position. For example, the selecting lever if standing over "H" may be swung into the extreme opposite position over "R." This is because when the clutch lever 41 is in extreme forward position the slots 35 in all of the slides are in line and the block 37 may be freely moved transversely into alinement with any of the slides.

A very great advantage of this construction is that the actual engagement of the gears is not absolutely automatic, but under the control of the driver. If the engaging function were absolutely automatic, it would be difficult to avoid serious clashing of the gears and frequent damage, but as the engaging motion is under the control of the driver, he can feel with his foot the conditions of the gears, with a gentle rearward movement of the clutch lever and if the gears do not readily slide together, the driver can refrain from allowing the clutch lever to be retracted by the spring and thus avoid clashing of the gears until they have turned, so that they will smoothly slide together. This construction secures all of the advantages of the present manually operated gear shift lever and dispenses with that lever.

The foregoing described construction makes it necessary to throw the clutch out far enough to move the yoke 39 to a point sufficient to bring the pin 49 out of engagement with the comb before the controlling lever 62 can be shifted. Whenever it is desirable to provide for shifting the lever 62 before disengaging the clutch, the construction shown in Figs. 9 and 10 may be employed, in which 62$^a$ is a controlling lever which is loosely journaled on the upper end of shaft 59$^a$ and 62$^b$ is an intermediate bifurcated lever which is rigidly secured to the shaft 59$^a$ and holds the lever 62$^a$ yieldingly in a central position by means of interposed opposing coil springs 62$^c$. With this construction even though the clutch is still in, the clutch lever 62 may be swung into any position desired, which will cause a corresponding compression of a spring 62$^c$ and as soon as the clutch is released, then the opposite spring will expand and force the lever 62$^a$ into a central position, thereby shifting the pin 49. This construction avoids the necessity of operating the controlling lever at any particular time in the order of operation.

What I claim is:

1. A gear shifting mechanism comprising a system of gears, a rod connected with said system and operable in two directions to shift the gears of said system, a pair of slidable bars, one of which is connected with said rod, means connecting said bars for moving either of them in a direction opposite to that in which the other is moved, a selective means having an operative stroke in one direction and adapted to be engaged with either of said bars, means for setting said selective mechanism in the desired position, a clutch, a clutch lever for operating the clutch, means positively connected with the clutch lever and having a limited movement with respect thereto for moving the selective mechanism and thereby operating the bar engaged therewith to shift the rod and move the associated gears into position.

2. A gear shifting mechanism comprising a gear system, a clutch for controlling the same, a lever for operating said clutch, a manually operated selecting means, a plurality of bars for shifting said gears, a plurality of pairs of rods with one rod of each pair connected with a bar, motion reversing means between the two rods of each pair for causing them to be actuated in reverse directions, a selecting mechanism operated by said selecting means for engaging with either member of either pair of rods, and a positive connection with a definite lost motion from the clutch lever to the selecting means for moving the latter when the clutch lever is operated in either direction.

3. A gear shifting mechanism comprising a system of gears, a clutch for controlling said gears, a clutch lever for operating the clutch, a plurality of bars for moving said gears, a plurality of pairs of rods with one rod of each pair connected to a bar, a reversing crank connecting both members of a pair of rods, each rod having a notch, a block slidable into engagement with any of said notches, means connected with the clutch lever for moving the block in a direction longitudinal of the rods to shift the rod with which the block engages, and a manually operated device for shifting said block laterally into engagement with either of said rods.

4. A gear shifting mechanism comprising a system of gears, a clutch for controlling said gears, a clutch lever for operating the clutch, a plurality of bars for moving said gears, a plurality of pairs of rods with one rod of each pair connected to a bar, a reversing crank connecting both members of a pair of rods, each rod having a notch, a block slidable into engagement with any of said notches, means connected with the clutch lever for moving the block in a direction longitudinal of the rods to shift the rod with which the block engages, a manually operated device for shifting said block laterally into engagement with either of said rods, and a comb for guiding said block when it is being moved to shift a rod, preventing disengagement of the block from the rod during such movement.

5. A gear shifting mechanism comprising a system of gears, gear selecting means including a lever, elastic means intermediate said lever and said selecting means to actuate the selecting means when resistance to the movement of the selecting means is removed, said elastic means permitting the setting of said lever while the selecting means is stationary, and means controlled by the selecting means for moving the selected gears into position.

6. A gear shifting mechanism comprising a plurality of slides arranged parallel with each other, each of said slides having a projecting offset arm, certain of said offset arms being projected oppositely from the other offset arms, cranks extending between and connecting oppositely projecting offset arms for compelling opposite direction of movement of the connected slides, a system of gears connected with said slides and shifted thereby, slide operating means, and selective means for engaging said slide operating means with either of said slides.

7. A gear shifting mechanism comprising a system of gears, a selecting lever, a plurality of gear shifting devices, means operated by said selecting member and movable transversely of said devices for engaging any one of said devices to move the associated gears into or out of position, and means for guiding said transversely movable means in a longitudinal path parallel with said gear actuating devices to keep the said means in engagement therewith during the shifting operation.

In testimony whereof, I have hereunto set my hand at Los Angeles, California this 31st day of March, 1913.

PERCY F. RICE.

In presence of—
GEORGE T. HACKLEY,
MARTHA M. LANGE.